Figure 6:
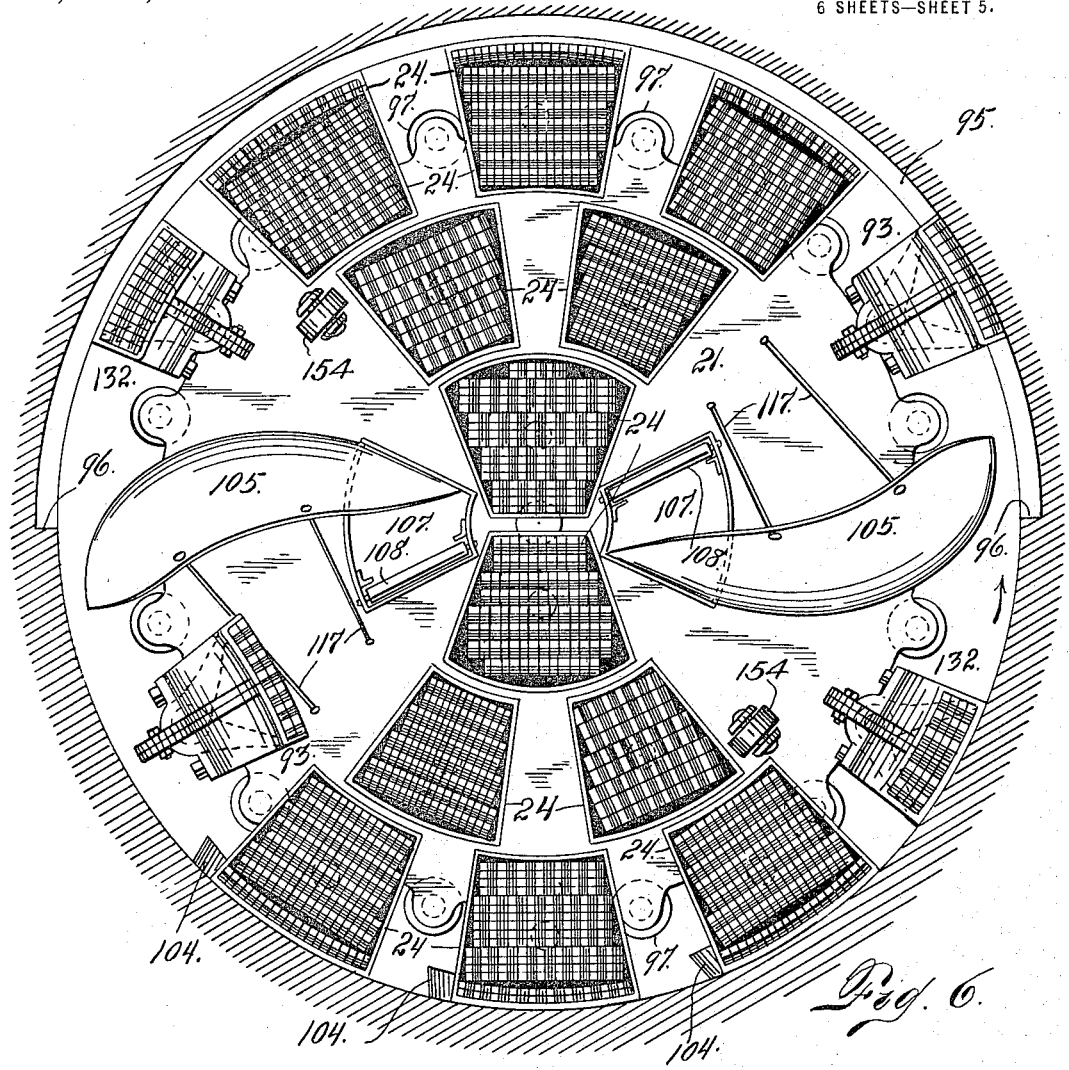

C. W. HODGSON.
TUNNELING MACHINE.
APPLICATION FILED DEC. 3, 1912. RENEWED OCT. 23, 1915.
1,185,797.
Patented June 6, 1916.
6 SHEETS—SHEET 1.
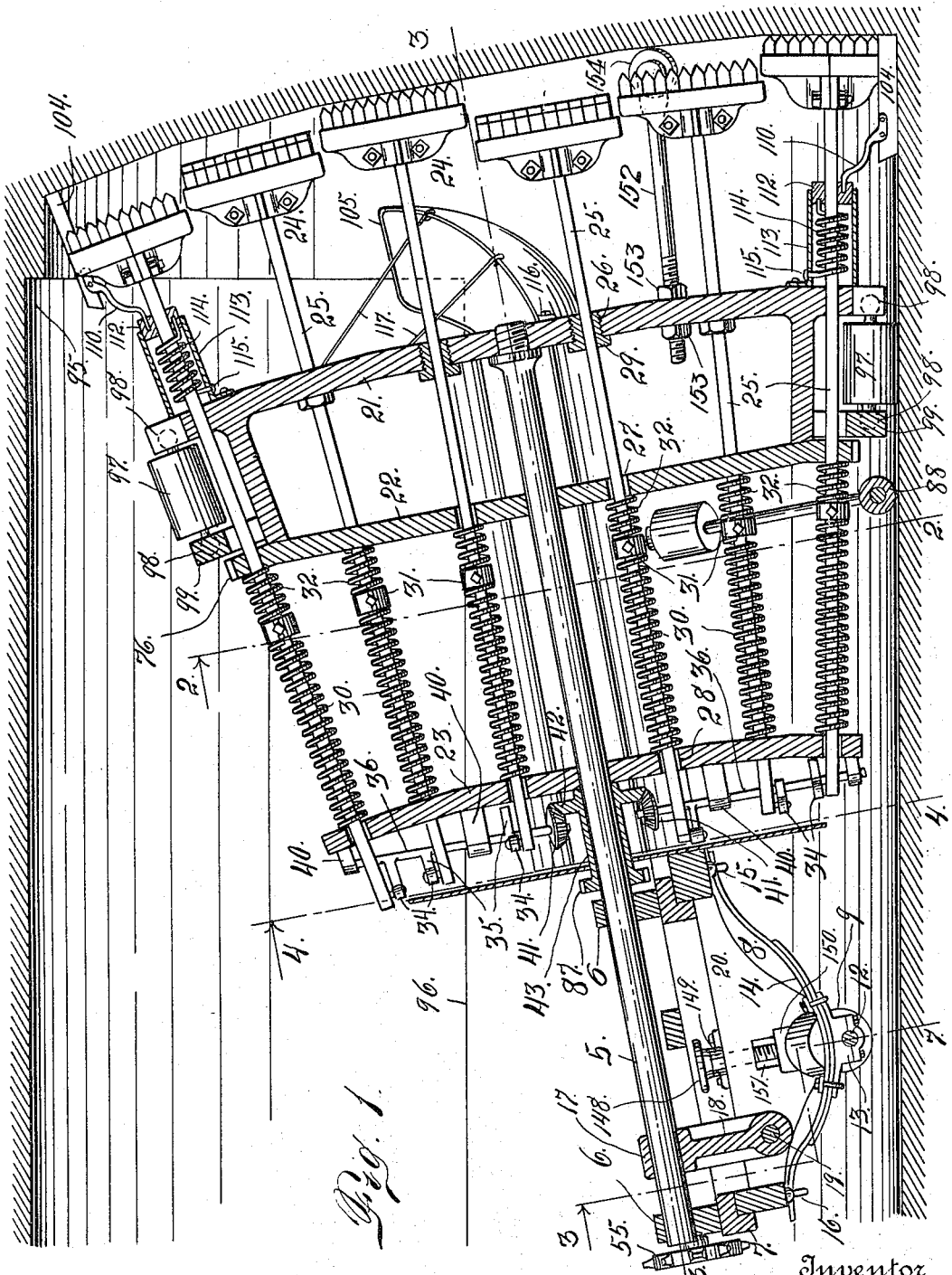
Witnesses
Otto E. Hoddick.
C. H. Rossner.
Inventor
Carl W. Hodgson.
By
Attorney C. W. HODGSON.
TUNNELING MACHINE.
APPLICATION FILED DEC. 3, 1912. RENEWED OCT. 23, 1915.
1,185,797.
Patented June 6, 1916.
6 SHEETS—SHEET 2.
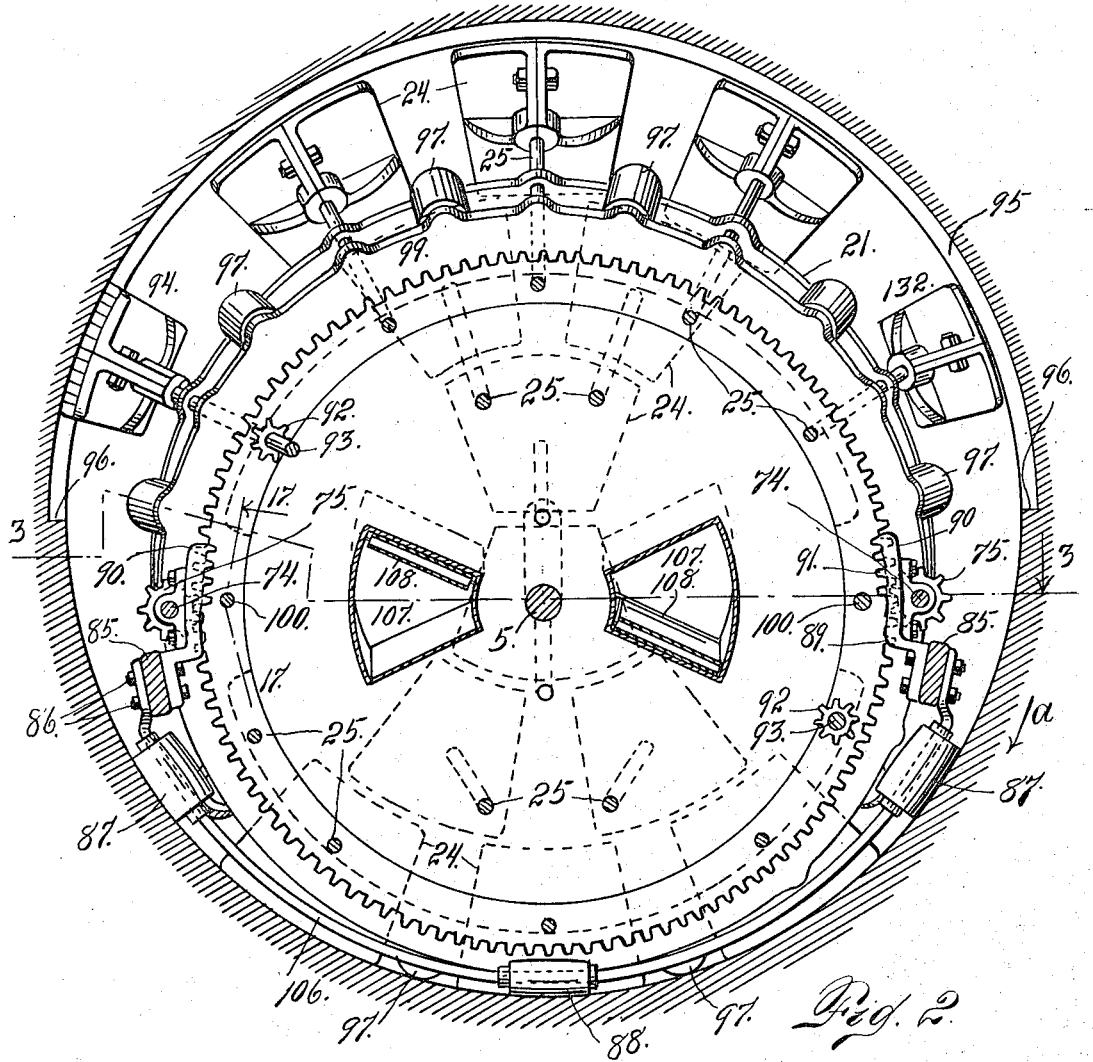
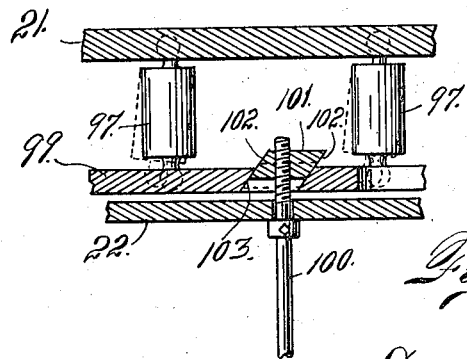

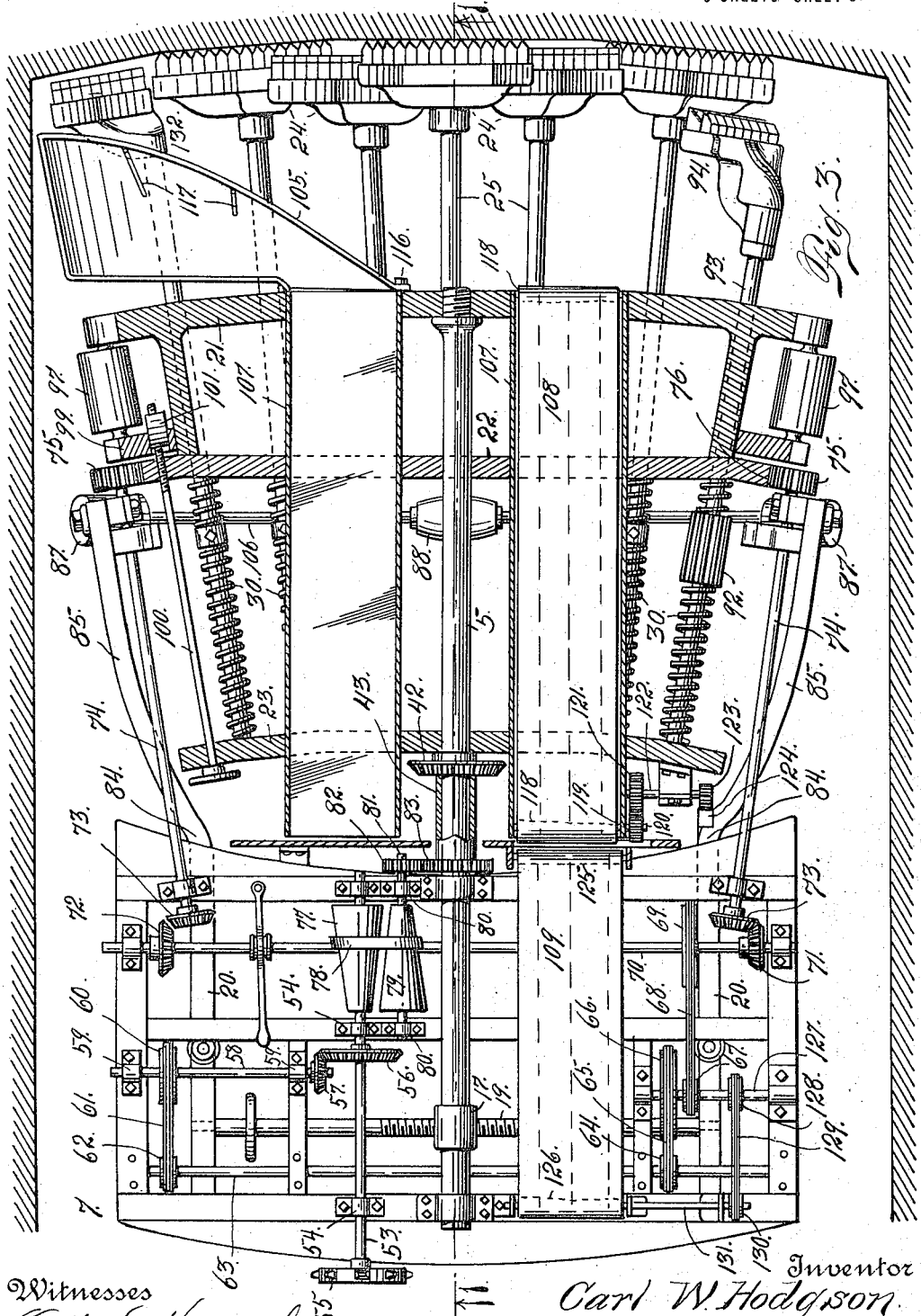

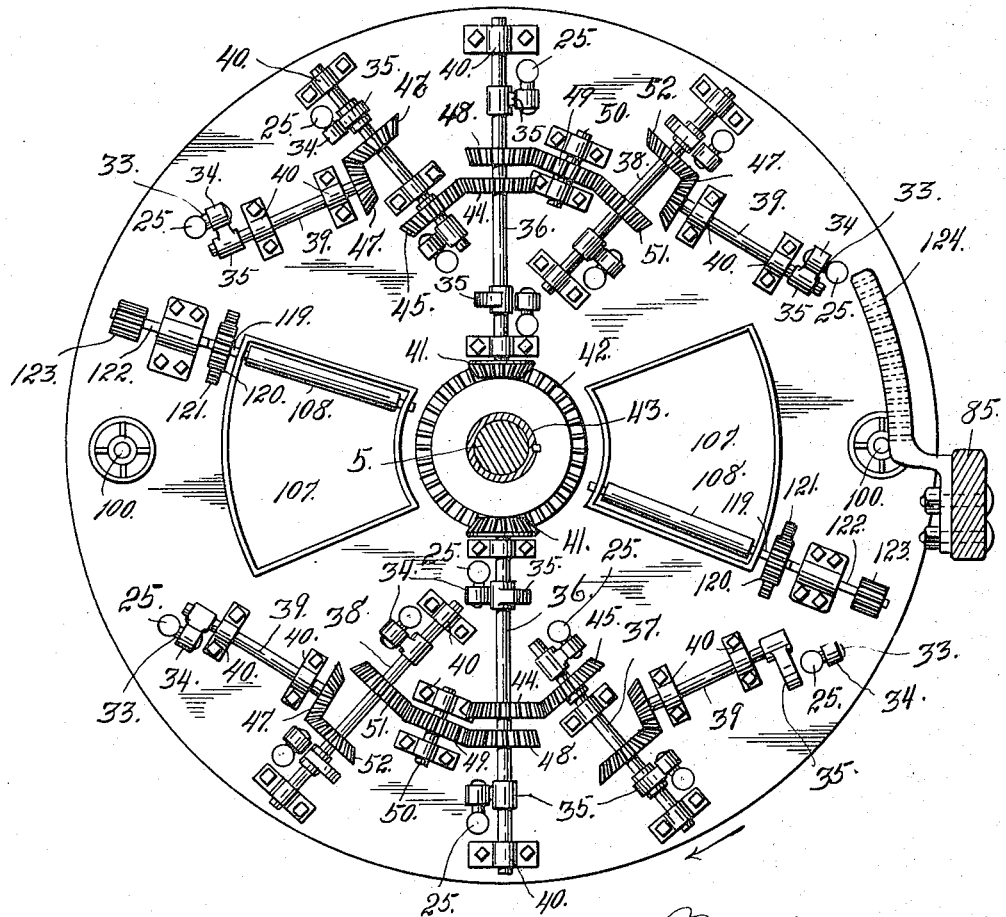
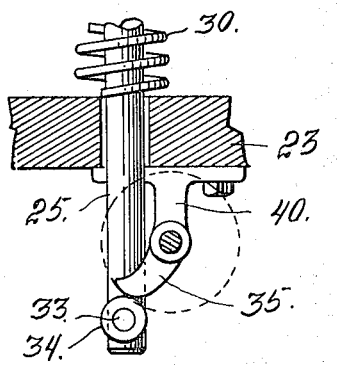

C. W. HODGSON.
TUNNELING MACHINE.
APPLICATION FILED DEC. 3, 1912. RENEWED OCT. 23, 1915.

1,185,797.

Patented June 6, 1916.
6 SHEETS—SHEET 5.

Witnesses
Otto E. Hoddick
C. H. Rossner

Inventor
Carl W. Hodgson
By
Attorney

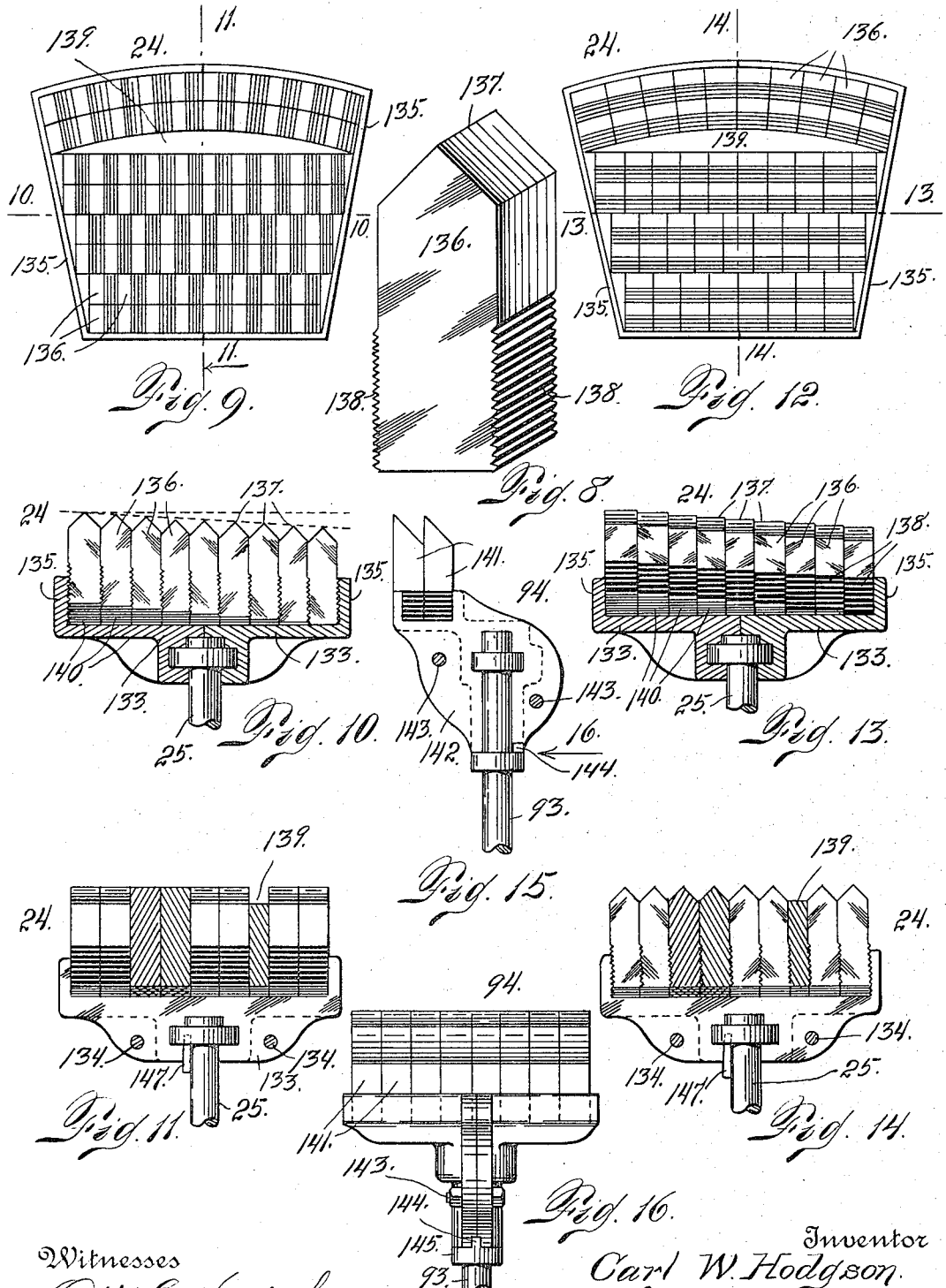

UNITED STATES PATENT OFFICE.

CARL W. HODGSON, OF DENVER, COLORADO.

TUNNELING-MACHINE.

1,185,797. Specification of Letters Patent. Patented June 6, 1916.

Original application filed November 5, 1909, Serial No. 526,352. Divided and this application filed December 3, 1912, Serial No. 734,677. Renewed October 23, 1915. Serial No. 57,627.

*To all whom it may concern:*

Be it known that I, CARL W. HODGSON, a citizen of the United States, residing in the city and county of Denver and State of Colorado, have invented certain new and useful Improvements in Tunneling-Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in tunneling machines, and has a number of features in common with the construction disclosed in my previous application, Serial No. 526,352, filed November 5, 1909. In this construction provision is made for disintegrating the rock through the instrumentality of reciprocating, cutting or abrading members, a series of said members being mounted upon a structure arranged to rotate when the abrading members are in operation, whereby each abrading member changes its position after each stroke, whereby the abrading or rock-cutting operation is effectually accomplished.

As illustrated in the drawing, each abrading head or member is mounted upon a reciprocable shaft to which the rearward movement is imparted through the instrumentality of a cam, whereby a power spring is compressed, the recoil of the spring, as soon as the shaft is released from the action of the cam, serving to drive the abrading member forwardly against the breast of the rock. The cams which impart the rearward movement to the various abrading members are so arranged that they occupy different positions circumferentially on the said shafts with the result that the different abrading or cutting heads do not all strike the rock at the same time, but perform the abrading function as nearly successively as is practicable. By virtue of this construction and arrangement the abrading members may be effectively operated at the expense of less power than would be required if they were all moved rearwardly simultaneously. Provision is also made for catching the muck or rock cuttings as they fall from the breast of the rock, and carrying them rearwardly and depositing them at the rear of the machine. These features, as thus far outlined, are common to the structure disclosed in my aforesaid application.

In my present construction, the tunneling structure, so far as the rotating apparatus is concerned, has the general shape of the frustum of a cone, the extremity where the abrading or cutting heads are located having the greatest diameter, the said structure tapering rearwardly, thus relieving, so far as practicable, any tendency for the apparatus to get stuck in the tunnel. By virtue of the fact that the said structure diminishes in diameter from its forward extremity rearwardly, there is no tendency for the parts in the rear of its forward extremity to be obstructed by engagement with the surrounding walls of the tunnel, or to become wedged through the interposition of muck or other material between the said structure and the tunnel walls, as might be the case if the rotary apparatus of the machine were approximately of the same diameter from the front to rear. Furthermore, provision is made in my improved construction for cutting a portion of the wall of the tunnel away to a greater extent, said portion extending therearound a suitable distance, this distance being illustrated in the drawing as approximately half way around or through a semi-circumference, the said enlargement being in the upper portion or half of the tunnel, whereby it becomes practicable to support an arch-shaped roof for the tunnel, the lower edges of which roof rest upon offsets or shoulders at the extremities of the semi-circumferential enlargement. In order to accomplish the aforesaid function, certain of the abrading or cutting members are eccentrically mounted and automatically actuated during the rotation of the structure in such a manner that the said heads are thrown into the cutting position while traveling through a semi-circumference of the tunnel, and automatically thrown out of the cutting position by partial rotations of the shafts upon which they are mounted, the said shafts carrying pinions which engage cogged racks for the purpose of imparting the said movement.

Another novel feature of my improved construction consists of scrapers which are carried by the rotating structure, the said scrapers extending to the breast of the rock and being sufficiently inclined to the axis of the tunnel, to cause the muck or rock cuttings as they accumulate in the lower part of the tunnel, to travel rearwardly a sufficient distance to cause them to be delivered to the receptacles which in turn discharge them upon the upper and rearwardly traveling run of a conveyer which is automatically and intermittently actuated during the operation of the machine, the said muck being again discharged upon the second continuously moving conveyer, which discharges it at the rear extremity of the machine entirely out of the way, whereby it does not interfere with the operation.

Another novel feature of my improved construction consists in the employment of rollers mounted upon the rotary structure and engaging the breast of the rock whereby the forward movement of the rotary structure carrying the cutting or abrading heads is made equal throughout the abrading area, thus preventing a portion of the structure, as on one side thereof, from traveling more rapidly than the rest, due to the uneven hardness of the rock upon which the machine is acting. This feature prevents any change in direction of the travel of the machine except when such is desirable and due to the manipulation of certain elements of the construction, as hereinafter fully explained.

Finally, my present improvement includes special constructions of abrading or cutting heads, the said heads being each composed of a series of independently adjustable members which, when properly arranged, are securely clamped in the assembled relation.

Having briefly outlined my present improvement, I will proceed to describe the same in detail, reference being made to the accompanying drawing, in which is illustrated an embodiment thereof.

Figure 7:
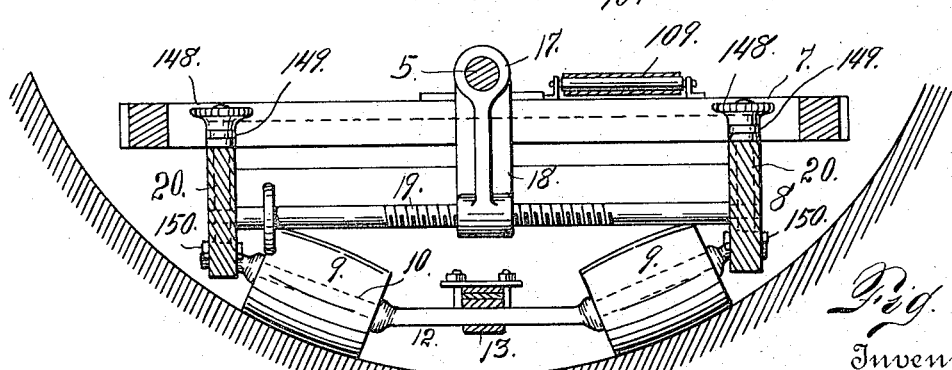

Figure 1 is a detail vertical longitudinal sectional view taken approximately upon the line 1—1, Fig. 3. Fig. 2 is a cross sectional view taken upon the line 2—2, Fig. 1. Fig. 3 is a view of the machine partly in plan and partly in section upon the line 3—3, Fig. 2. Fig. 4 is a rear view partly in section upon the line 4—4, Fig. 1. Fig. 5 is a detail view of one of the cam devices for actuating the reciprocable hammer shafts. Fig. 6 is an elevation of the forward extremity of the machine. Fig. 7 is a view in section substantially upon the line 3—7, Fig. 1. Fig. 8 is a view in perspective of one of the abrading sections with which the abrading heads are provided. Fig. 9 is a face view of an abrading head with the abrading sections in place. Fig. 10 is a section upon line 10—10, Fig. 9. Fig. 11 is a section upon line 11—11, Fig. 9. Fig. 12 is a view similar to Fig. 9, but showing a different arrangement of the abrading sections or chisels. Figs. 13 and 14 are sections taken upon the lines 13—13 and 14—14, respectively, Fig. 12. Fig. 15 is a view partly in section of the auxiliary cutting head. Fig. 16 is an elevational view looking in the direction of arrow 16, Fig. 15. Fig. 17 is a detail view in cross section upon the line 17—17, Fig. 2, illustrating the means for controlling the horizontal direction of the machine.

In this drawing: Let the numeral 5 designate a main centrally arranged shaft which is journaled in bearings 6 mounted on a framework 7 which is laterally adjustable upon a carriage 8 mounted on rollers 9 which engage the lower portion of the wall of the tunnel, the said rollers being mounted on inclined members 10 of an axle 12, the latter being journaled in a box 13 carried by a semi-elliptical spring 14 whose extremities are respectively secured to the forward and rear extremities of the carriage as shown at 15 and 16. The shaft is further journaled in an eye 17 formed in the upper extremity of a depending arm 18 whose lower extremity is threaded to receive a transversely arranged screw shaft 19 which is journaled in side members 20 of the carriage. This shaft 5 extends forwardly beyond the carriage and upon it are mounted and made fast three disks 21, 22 and 23, the disk 21 being foremost, the disk 22 located in the rear thereof, and the disk 23 rearmost. These disks, in connection with the main shaft, constitute the body of the rotary structure carrying the reciprocable abrading or cutting heads, as hereinafter more fully described. These heads, so far as the greater number of them is concerned, may be designated by the numeral 24. Each head is mounted and made fast upon the forward extremity of a shaft 25 passing through perforations 26, 27 and 28 formed in the respective disks. The perforation in the foremost disk 21 has a bushing 29 threaded thereinto, the said bushing having an opening in which the shaft 25 slides freely. These bushings accurately guide the shafts during their reciprocating movement, and prevent them from getting out of proper alinement in the rotary structure.

Mounted on each shaft 25 is a power spring 30 which is interposed between an adjustable stop 31 and the forward face of the rearmost disk 23. Between the stop 31 and the disk 22 is a buffer spring 32, which prevents any tendency to injure the structure by concussion or jar during the forward movement of the cutting or abrading head.

Upon the rear extremity of each shaft 25 is mounted a wrist-pin 33 carrying an antifrictional roller 34 adapted to be acted upon by a cam 35 carried by shafts 36, 37, 38 and 39. As illustrated in the drawing, there are two shafts 36, two shafts 37, two shafts 38 and four shafts 39, and each carries one or more cams 35. Where there is more than one cam on a shaft they are suitably spaced circumferentially on the shaft whereby the cams act successively upon the wrist-pin rollers of the reciprocable shafts to which the rearward movement is imparted by the said cams. These shafts are journaled in suitable bearings 40 mounted on the rearmost disk 23. The two shafts 36 are radially arranged upon the disk, and their inner extremities are equipped with bevel pinions 41 which mesh with a relatively large bevel gear 42 carried by a sleeve 43 loose on the main shaft 5. Approximately midway between the extremities of each shaft 36 is located a bevel gear 44 which meshes with a similar gear 45 fast on a shaft 37. Each shaft 37 is also equipped with a bevel gear 46 meshing with a similar gear 47 fast on a shaft 39. Furthermore, each shaft 36 is equipped with a gear 48 meshing with a gear 49 carried by a counter shaft 50. This gear 49 in turn meshes with a gear 51 fast on a shaft 38 which also carries a gear 52 meshing with a gear 47 of another shaft 39. As each shaft 36 is connected in the same manner with shafts 37, 38 and 39, it will be understood from the foregoing description that from each shaft 36 rotary motion is imparted to a shaft 37, a shaft 38 and two shafts 39.

As illustrated in the drawing, each shaft 36 carries a number of cams 35, which is also true of each of the shafts 37 and 38, while each shaft 39 carries but a single cam. There must, of course, be a cam for each reciprocable shaft 25 and the shafts 36, 37, 38 and 39 are constructed and arranged with this end in view, as best illustrated in Fig. 4.

Referring now more particularly to Fig. 3 of the drawing, let the numeral 53 designate a shaft journaled in bearings 54 mounted on the frame member 7. The rear extremity of this shaft is equipped with a sprocket wheel 55 to which power may be transmitted from any suitable prime motor, (not shown). This shaft 53 is equipped with a gear 56 meshing with a pinion 57 fast on a shaft 58 journaled in boxes 59 and carrying a wheel 60 connected by means of a flexible element 61 with a wheel 62 fast on a rear shaft 63 which is transversely arranged on the framework 7. This shaft 63 is further provided with a wheel 64 connected by means of a flexible element 65 with a larger wheel 66 mounted upon a countershaft 127, upon which is also mounted a relatively small wheel 67 which is connected by means of a flexible element 68 to a relatively large wheel 69 fast on a shaft 70 which is equipped with gears 71 and 72, and endwise shiftable to cause it to mesh with either pinion 73 of forwardly extending shafts 74, which are equipped at their forward extremities with gears 75 which mesh with a large gear 76 formed on the outer edge or periphery of the disk 22 whereby rotary movement is imparted to the structure composed of the disks 21, 22 and 23, the main shaft 5, the reciprocable shafts 25 and their cutting heads 24.

The shaft 53 extends forwardly beyond the bearing 54 and is equipped with a cone pulley 77 which is connected by means of a belt 78 with a similar but reversely arranged pulley 79, the latter being journaled at its opposite extremities in bearings 80. One extremity of a shaft 81 carrying the cone pulley 79 is equipped with a fast gear 82 which meshes with a gear 83 fast on the sleeve 43, whereby rotary movement is imparted to the said sleeve and the gear 42 for the purpose of operating the various shafts 36, 37, 38 and 39, through whose instrumentality the cams are actuated by imparting the reverse movement to the various shafts 25 carrying the abrading or cutting heads 24.

Attention is called to the fact that the three disks 21, 22 and 23 are of varying diameters, the disk 21 being largest, the disk 22 somewhat smaller, and the disk 23 smallest. By reason of this variation in size the rotatable structure has approximately the shape of the frustum of a cone, whereby there is no opportunity for wedging the rotating apparatus within the tunnel in the rear of the cutting or abrading heads, as heretofore explained. By virtue of this variation in the size of the said disks which constitute the framework carrying the reciprocable shafts 25, it becomes necessary that some of these shafts shall have their axes inclined considerably to the axis of the main shaft 5. During the operation of the machine it is so arranged that at its lowermost side the adjacent shaft 25 is parallel, or approximately parallel, with the wall of the tunnel. By virtue of this arrangement there is a relatively large space above the rotary structure within the tunnel, thus giving increased facilities for looking after the mechanism during its operation without removing the structure from the tunnel.

The side members 20 of the carriage 8 occupy positions parallel with each other for a certain distance. However, at points 84, (see Fig. 3), the said members are bent outwardly, and merge into forward extensions 85 to which are attached, by means of bolts 86, the opposite extremities of a curved axle 106, as best illustrated in Fig. 2. This axle carries side rollers 87 and an intermediate bottom roller 88, which are journaled upon the axle 106 and engage the walls of the tunnel. To the forward extremities of the extensions 85 are also secured angle brackets 89 having upwardly extending arms 90 provided with teeth or cogs 91, thus forming the parts 90 into cogged racks, adapted to engage pinions 92 fast on two reciprocable shafts 93 on whose forward extremities are eccentrically mounted cutting or abrading heads 94.

The object of the racks 90 is to impart partial rotary movements to these shafts 93, whereby, when in one position, namely, that illustrated in Fig. 3, the head is thrown out of commission, or away from the breast of the rock, while when in another position, namely, that shown at the left of Fig. 2, the head 94 is thrown into operative relation with the breast of the rock and occupies a position farther outward, circumferentially, than the cutting or abrading heads 24. The object of these two cutting or abrading heads 94 is to form the tunnel somewhat larger through a portion of its circumference, its enlarged part being indicated by the numeral 95 in Figs. 2 and 6, and extending through approximately a semi-circumference of the bore, leaving shoulders or offsets 96 at its extremities, adapted to form a support for an arched roof, with which it may be advantageous to provide the tunnel. Hence the racks 90 are arranged in the path of pinions 92 fast on the shafts 93, being further so arranged that as the rotary structure continues its movement in the direction indicated by arrow $a$ (see Fig. 2), the pinion 92 of one of these shafts will engage the teeth 91 of the rack 90 at the proper time on the downwardly moving side of the rotary structure, to impart a partial rotation to the shaft 93 and throw the cutting head inwardly toward the longitudinal axis of the tunnel, by virtue of the fact that the head 94 is eccentrically mounted on its shaft, as heretofore explained. This act is accomplished at the desired instant to terminate the cutting operation of each of these heads when it has reached the desired point in its rotary travel. Again, as soon as the pinion 92 has reached the rack 90 on the opposite side of the structure, this pinion will engage the last named rack and the shaft will be actuated rotatably to return its head 94 to the proper position for cutting the enlargement 95 in the bore of the tunnel.

The rotary framework carries a series of rollers 97 which are mounted thereon by means of ball and socket joints 98, thus making it practicable to change the direction of their axes by shifting the bearing ring 99 in which the journals at the rear extremities of the rollers, are located. This may be accomplished by means of a screw stem 100 mounted in the disks 22 and 23, and carrying at its forward extremity a block 101 having parallel beveled extremities 102 adapted to engage a socket 103 of counterpart shape formed in the said bearing ring 99.

The rotary cutting or abrading heads 94 are arranged to travel a short distance in the rear of the zone occupied by the heads 24, whereby the eccentrically mounted heads 94 are swung into and out of operative position without interfering in any way with other parts of the mechanism.

The rotary structure is further equipped with scrapers 104 which occupy a position inclined to the axis of the rotary structure, the said scrapers extending from the breast of the rock rearwardly a short distance and being adapted, as the apparatus rotates, to move the muck or rock cuttings rearwardly whereby the said cuttings are in position to be received by the scoops 105 which are connected with the forward extremities of conduits 107 in which are located belt conveyers 108, the scoops being so arranged that after each has traveled through the lower part of the tunnel it takes up the muck in its path and as it moves upwardly to the desired elevation, the muck is discharged upon the conveyer 108 which is then in the lower part of the conduit 107, and the muck, being carried rearwardly by this conveyer, which travels bodily with the rotary structure of the machine, is finally delivered by the conveyer 108 to a conveyer 109 located in the rear of the rotary structure of the machine and mounted on the non-rotatable carriage 8 of the apparatus.

Each of the scrapers 104 is connected by means of an arm 110 with a block 112 located in the forward extremity of a sleeve 113 carried by the disk 21. The block 112 is connected with one extremity of a spiral spring 114 located within the sleeve, the opposite extremity of the sleeve being secured to the spring as shown at 115. The scraper is so connected with the block 112, and the latter with the spring 114, that the torsional tension of the spring is sufficient to maintain the scraper in operative relation with the other parts of the mechanism, whereby the muck is carried rearwardly from the breast of the rock into the path of the scoops 105. Should a scraper encounter an obstacle on the wall of the tunnel which was of such character that it would not yield, the only result would be that the scraper, together with its block 112, would turn in the sleeve 113 against the torsional resistance of its spring 114 until the scraper had passed the obstacle, when the torsional tension of the spring would return the scraper to its normal position.

The scoops 105 are connected with the forward extremities of the conduits 107 by suitable fastening devices 116, the scoops being further supported by means of tie rods 117 which are connected with the disk 21. Each conveyer 108 consists of an endless belt mounted on rollers 118 journaled in the opposite extremities of the corresponding conduit 107. The rearwardly located roller is positively rotated for the purpose of actuating the conveyer by means of a gear 119 mounted on an extension 120 of the roller journal, the gear 119 meshing with a second gear 121 fast on a spindle 122 which also carries a pinion 123 adapted to intermittently engage a rack bar 124 for actuating the conveyer. The rack bar 124 is mounted on the non-rotary carriage of the structure and is arranged in the path of the pinion 123 during the movement of the rotary structure through a portion of its circumferential travel. This intermittent movement of the conveyer 108 is sufficient to actuate the latter whereby the muck is gradually carried rearwardly and delivered to the conveyer 109, which is similar in character. The conveyer 109 is mounted on rollers 125 and 126 journaled in the carriage 8, the roller 126 being located at the forward extremity of the conveyer. This last named roller is actuated from a shaft 127 upon which is mounted a wheel 128 which is connected by means of a flexible connection 129 with a wheel 130 fast on an extension 131 of one of the journals of the roller 126. The shaft 127 is operated from the shaft 63 by virtue of the connection and arrangement of parts heretofore described, and as best illustrated in Fig. 3.

In addition to the cutting or abrading heads 24, two additional heads 132 are employed, which are slightly different in structure from the heads 24 in that their cutting or abrading surface is of somewhat less area. These heads, however, are actuated in the same manner as the heads 24, and their shafts constantly maintain their position with reference to the operating cams. It should be stated, however, with reference to the shafts 93 of the eccentrically mounted heads 95, that when these heads are shifted to the inoperative position, (see Fig. 3), the wrist pin 33 carrying the antifrictional roller 34, (see the structure at the lefthand side of Fig. 4), is thrown out of the path of the operating cam 35, hence the shaft 93 will not be reciprocated until it is moved rotatably to return its cutting head 94 to its operative position.

The cutting heads 24 are of special construction, as illustrated in Figs. 8 to 13 inclusive. Each of these heads is composed of a holder consisting of two members 133 which are secured by means of bolts 134 whereby the two members are clamped to the forward extremity of the shaft 25. These holder members are provided with forwardly extending flanges 135, the two flanges of each holder being approximately of keystone shape, cutting or abrading sections 136 being located therein, and properly secured by means of the bolts 134. These sections 136 are approximately square in cross section and are beveled at their outer extremities to form cutting or abrading edges 137. The shanks of the sections 136 are toothed on opposite sides as shown at 138 to facilitate the proper adjustment of the sections within their holders. This toothed feature also facilitates the securing of the sections within their holders against displacement. These sections 136 are arranged side by side within the holder and with the toothed faces 138 of their shanks, in engagement. The sections are so arranged within their holders that their cutting edges 137 occupy a plane inclined to the breast of the rock, the variation in the arrangement of the cutting edges from a plane at right angles to the axis of the shaft 25, being in the direction of the travel of the head, the rearmost sections of the head,— referring to the direction of the head's rotary travel,—having their cutting edges foremost with reference to the longitudinal travel of the head within the tunnel, whereby during the operation of the head, the various sections of each series arranged in the direction of the head's rotary travel, may act upon the breast of the rock much more advantageously than would be the case if the cutting edges all lay in a plane at right angles to the axis of the shaft, as will be readily understood.

As illustrated in the drawing, each head 24 has a number of rows, or series, of cutting or abrading sections, and the various sections of adjacent heads forming a part of the rotary structure are preferably so arranged that the direction of the cutting edges in the one head may be at right angles, or approximately right angles, to the direction of the cutting edges of an adjacent head, the relative arrangement of the sections of adjacent heads being that illustrated in Figs. 9 and 12.

The portions of the flanges 135 of each head which are circumferentially outermost during the tunneling operation are curved in order to conform to the curvature of the tunnel. From the opposite ends of this curved flange part of the head, the flanges approach each other to form a keystone shaped structure, as heretofore described. The two series of sections 136 adjacent the curved portion of the flange of the head are arranged in the arc of a circle, as best illustrated in Figs. 9 and 12. This curvature would leave a space between the circumferentially arranged sections and the adjacent sections, which space is filled by a plate or member 139.

It is preferred to make the sections 136 all of the same length and of uniform size. They may, however, be arranged within their holders to cause the plane of their forward edges to occupy a position forming oblique angles with the axis of the shaft 25, by the use of filling washers 140 placed within the holder, the said washers being arranged to produce the result heretofore explained.

The eccentrically mounted heads 94 are equipped with sections 141 of slightly different construction from the sections 136. These sections 141 have one cutting face only and as shown in the drawing, (see Figs. 15 and 16), only two rows or series of sections are employed, both of said rows or series being considerably beyond the line of the axis of the shaft in one direction, (see Fig. 15), whereby a partial rotation of the shaft will throw the cutting or abrading sections inwardly beyond their normal operating zone. Each head 94 also consists of a holder composed of two members 142 connected by clamping bolts 143 whereby the cutting or abrading sections 141 are secured within the head, and also whereby the head is secured to the forward extremity of its shaft 93. In order to prevent the head from turning upon its shaft, I employ a key 144 which is formed integral with a collar 145 fast on a shaft 93. This key 144 enters a recess of counterpart shape formed in the two holder members, as best illustrated in Figs. 15 and 16.

As the auxiliary cutting heads 132 are substantially of the same construction as the heads 94, it will not be necessary to further describe the heads 132 in detail. In the form of construction shown in Figs. 9, 10 and 11, 12, 13 and 14, each shaft 25 is connected with the holder of the cutting head by means of a key 147, which may be of any suitable construction.

In order to properly regulate or adjust the carriage structure to cause the latter to harmonize with the rotary structure of the machine when in its operative position, the side beams 20 of the carriage 8 are respectively equipped with vertically disposed screws 148 which are threaded in nuts 149 secured to the upper edges of the said beams, the said screws extending downwardly through openings formed in the beams and being swiveled in half bearings 150 which rest upon the extremities of the non-rotary axle 12 carrying the carriage rollers 9. These half bearings 150 are slidably mounted in openings 151 formed in the beams 20, and when it is desired to lower the running gear of the carriage, so to speak, with reference to the body thereof, the screws are turned to raise the half bearings 150 whereby there would be a tendency to raise said bearings, but as the screws are rotated, the said half bearings maintain their position upon the extremities of the axle 12 by virtue of the settling or downward movement of the carriage body in order to maintain the half bearings in their position upon the axles. In this event the lower edges of the beams 20 will gradually move downwardly below the extremities of the axle. On the other hand, should it be desired to raise the body of the carriage with reference to the running gear or the axle and rollers, the screws will be turned in the opposite direction, which would impart a lifting movement to the side beams 20, or a movement the reverse of that heretofore explained.

With reference to the function of the auxiliary abrading heads 132, attention is called to the fact that these heads are so arranged that they extend outwardly circumferentially slightly farther than the outermost heads 24 in order to ream out the bore of the tunnel, so to speak. It is assumed that during the operation of the outermost abrading heads 24, they will gradually become somewhat worn, whereby there would be a tendency for the tunnel to diminish in size, due to the failure of the abrading heads to maintain their normal abrading area. The auxiliary heads 132 are intended to compensate for this failure on the part of the other heads to wear, and thus maintain the normal diameter of the tunnel.

Extending forwardly from the foremost disk 21 are two or more rods 152, which are passed through suitable perforations in the disk and are fixed in the desired longitudinal position with relation to the disk by means of nuts 153 one upon each side of the disk. A roller 154 is mounted in the free end of each rod 152 and is adapted to bear upon the breast of the rock. It is evident that the rods 152 and rollers 154 serve to act as gages to regulate the distance between the breast of the rock and the forward disk 21. The longitudinal adjustment of the rods accomplish a two-fold function, first, where the rock being tunneled is uniform in hardness, the adjustment is employed to take up wear upon the abrading chisels and second, where the hardness of the rock varies as the tunnel proceeds, the adjustment is brought into play to regulate the point in the forward stroke of the abrading heads at which they first touch the face of the rock, it being apparent that for hard rock, the strongest portion of the blow or that near the end of the stroke of the abrading head should be utilized while if the rock is comparatively soft, the blow may begin earlier in the stroke and the cut may extend deeper into the rock.

From the foregoing description, the use and operation of my improved tunneling machine will be readily understood.

The rotary structure of the machine is rotated from the shaft 53, to which motion is originally imparted from a prime motor of any suitable description, connection being made with the sprocket wheel 55, as heretofore explained. During the operation of the rotary structure, rock or other material is disintegrated, and falls to the bottom of the tunnel, where it is carried rearwardly by the scrapers 104 into the path of the scoops 105, by which it is taken up and discharged upon the belt conveyer 108 which carries it rearwardly and delivers it to the belt conveyer 109 mounted upon the non-rotary structure, the last named conveyer discharging it at the rear extremity of the machine.

During the operation of the rotary structure the abrading heads 94, which are eccentrically mounted on their shafts 93, are alternately thrown into and out of operative relation with the breast of the rock in order to form the circumferential enlargement 95 of the tunnel bore, as heretofore explained. During the rotary action of the rotary structure, the rollers 97 engage the wall of the tunnel and the direction of the longitudinal travel of the machine is determined by the adjustment of the axes of these rollers.

The power taken from the shaft 53, is transmitted to the shaft 70 and from the latter to one of the shafts 74 and its gearing connections, to the gear 76 of the rotary structure whereby the rotary motion is imparted to the latter. Power is also taken from the shaft 53 through the medium of the cone pulleys 77 and 79, the gears 82 and 83, the sleeve 43, and the gear 42 for operating the cam shafts 36, 37, 38 and 39, through whose instrumentality the rearward movement is imparted to the shafts carrying the abrading heads, whereby the power springs 30 are compressed and serve to drive the shafts and their heads forwardly as soon as the antifrictional bearing members of the shafts are disengaged from their respective cams.

When it is desired to adjust the body of the carriage 8 with reference to the running gear, and for the purpose of establishing the proper positional relation of the carriage to the rotary structure, the screws 148 are operated in the manner heretofore explained.

Having thus described my invention, what I claim is:

1. In a tunneling machine, the combination with a longitudinal traveling carriage, of a structure rotatably mounted thereon, and equipped with abrading members, rollers mounted on the structure and exteriorly arranged to engage the wall of the tunnel, a circumferentially adjustable ring in which one extremity of each roller is journaled, and a fixed ring in which the other extremity of each roller is journaled, whereby the rollers may be turned through the medium of the adjustable ring at an angle with the axis of the main structure.

2. In a tunneling machine, the combination with a relatively stationary framework, of a structure mounted to rotate on the framework and carrying a series of reciprocable abrading heads located at its forward extremity, means for reciprocating the abrading heads, and means mounted upon forward extremities of the framework for imparting rotary movement to the said structure, the forward extremities of the framework being connected by a curved axle provided with parts adapted to engage the floor, and a portion of the sides of the tunnel, for the purpose set forth.

3. The combination with a relatively stationary framework, of a structure rotatably mounted thereon and carrying a series of reciprocable abrading heads, the rotary structure having its axis inclined to the axis of the tunnel and its greatest diameter at its forward extremity where the abrading heads are located, its diameter gradually diminishing toward the rear, and means mounted upon forward extensions of the framework for imparting rotary movement to said structure, said forward extremities of the framework being connected by a curved axle provided with rollers shaped to engage and conform to the periphery of the tunnel at certain points, whereby the framework is prevented from shifting laterally in the tunnel.

4. In a tunneling machine, the combination with a relatively stationary framework, of a structure rotatably mounted thereon and carrying a series of abrading heads, the said rotary structure having its greatest diameter at its forward extremity where the abrading heads are located, a number of auxiliary heads, shafts upon which the auxiliary heads are eccentrically mounted, the auxiliary heads being arranged to occupy one rotative position to operate in a circumferential zone extending beyond the zone of the other heads and to occupy another rotative position to lie within the zone of operation of the other heads.

5. In a tunneling machine, the combination with a relatively stationary framework, of a structure rotatably mounted thereon and carrying a series of abrading heads, a number of auxiliary heads, shafts upon which the auxiliary heads are eccentrically mounted, the auxiliary heads being arranged to occupy one rotative position to operate in a circumferential zone extending beyond the zone of the other heads and to occupy another rotative position to lie within the zone of operation of the other heads.

6. In a tunneling machine, the combination with a relatively stationary framework, of a structure rotatably mounted thereon and carrying a series of abrading members, a number of auxiliary heads, shafts upon which the auxiliary heads are eccentrically mounted, the auxiliary heads being arranged to operate in a circumferential zone extending beyond the zone of the other heads, and means for automatically imparting partial rotary movements to the shafts of the auxiliary heads on their own axes at suitable intervals during the rotary travel of the rotary structure, whereby the auxiliary heads are alternately thrown into and out of their zone of operation, substantially as described.

7. In a tunneling machine, the combination with a relatively stationary framework, of a structure rotatably mounted and carrying an auxiliary head, a shaft upon which the auxiliary head is eccentrically mounted, the auxiliary head being arranged to operate in a circumferential zone extending beyond the zone of the other heads, means for automatically imparting partial rotary movements to the shaft of the auxiliary head on its own axis at suitable intervals during the rotary travel of the rotary structure whereby the auxiliary head may be automatically thrown into and out of its zone of operation, and means for imparting the reciprocating movement to the auxiliary head.

8. In a tunneling machine, the combination with a relatively stationary framework, of a structure rotatably mounted thereon and carrying abrading heads reciprocably mounted, an auxiliary head, a shaft upon which the auxiliary head is eccentrically mounted, the auxiliary head being arranged to operate in a zone extending circumferentially beyond the zone of the other heads, means for automatically imparting partial rotary movements to the shaft of the auxiliary head on its own axis at suitable intervals during the rotary travel of the rotary structure, and means for imparting the reciprocating movement to the auxiliary head, said means comprising a cam carried by the rotary structure, the shaft of the auxiliary head carrying a bearing adapted to be engaged by the cam, the said bearing being radially fixed with respect to the shaft whereby it is thrown out of the path of the cam when the auxiliary head is thrown inwardly beyond the zone of operation.

9. In a tunneling machine, the combination with a relatively stationary frame, of a main shaft journaled on said frame and extending forwardly therefrom, a structure mounted on the shaft and connected to rotate therewith, abrading heads, shafts upon which the abrading heads are mounted and made fast, the said shafts being reciprocably mounted, cam shafts journaled on the rotary structure and adapted to engage antifrictional bearing members with which the shafts of the several abrading heads are equipped, a gear loose on the main shaft and connected in operative relation with the cam shafts, and means mounted on the stationary frame for actuating the gear on the main shaft, the shafts of the abrading heads being equipped with power springs which are placed under tension by the movement of the shafts when actuated by the cams, substantially as described.

10. In a tunneling machine, the combination with a relatively stationary framework, of a main shaft journaled thereon, a structure mounted on the shaft to rotate with the latter, abrading heads reciprocably mounted upon the rotary structure, power springs mounted on the shafts for imparting movement to the heads in one direction, cam shafts journaled on the rotary structure, the cams of the shafts being arranged to actuate the shafts of the abrading heads to place the power springs of the said shafts under tension, a gear applied exteriorly to the rotary structure, a shaft carried by the stationary framework, and an operative connection between the last named shaft and the gear of the rotary structure for imparting the rotary movement to the latter, substantially as described.

11. In a tunneling machine, the combination with a relatively stationary framework, of a rotary structure mounted thereon and carrying abrading heads, scoops for gathering the muck, and scrapers carried by the rotary structure and arranged in the zone of the abrading heads, the said scrapers being inclined to the direction of longitudinal travel of the machine to cause the muck to travel rearwardly from the breast of the rock and into the path of the scoops, substantially as described.

12. In a tunneling machine, the combination with a relatively stationary framework, of a structure rotatably mounted thereon and carrying abrading heads, scoops arranged in the rear of the abrading heads for gathering the muck, and scrapers mounted on the rotary structure and extending forwardly from the scoops into the zone of the abrading heads, the said scrapers being inclined to the axis of the tunnel and arranged to cause the muck resulting from the abrading action of the heads, to travel rearwardly into the path of the scoops during the rotary action of the structure.

13. In a tunneling machine, the combination with a relatively stationary framework, of a structure rotatably mounted thereon, abrading heads carried by the said structure, scoops arranged in the rear of the abrading heads for gathering the muck resulting from the abrading action of the heads, and scrapers extending forwardly from the path of the scoops into the zone of the abrading heads, the said scapers being inclined to the axis of the tunnel and arranged to cause the muck to travel rearwardly into the path of the scoops, and means for subjecting the said scrapers to torsional spring stress, for the purpose set forth.

14. A tunneling machine including a working head rotatably mounted and equipped with a series of longitudinally-reciprocable, abrading elements, said head having chambers extending longitudinally therethrough, conveyer belts passing through said chambers, and scoops mounted on the head and arranged to discharge into the said chambers, and means for imparting intermittent rearward travel to the upper run of the belts of the said chambers for the purpose of removing the muck, substantially as described.

15. A tunneling machine including a working head rotatably mounted and equipped with a series of independently-reciprocable, abrading elements, the said head having longitudinally - disposed chambers mounted therein, conveyer belts passing through the chambers, means carried by the head for taking up the muck and discharging it into said chambers, and means for imparting intermittent movement to the belts of the said chambers during the rotary action of the head, substantially as described.

16. A tunneling machine including a rotatable working head equipped with a series of longitudinally-reciprocable, abrading elements, the said head having longitudinally-disposed chambers extending therethrough, endless conveyers passing through the chambers, means for removing the muck and discharging it into these chambers, a frame mounted in the rear of the head, and a conveyer mounted on the said frame and arranged to receive the muck from the chambers of the rotary head, substantially as described.

17. In a tunneling machine, a rotary structure including rock abrading means, a scraper arranged in the zone of operation of the abrading means, said scraper being diagonally arranged with respect to the axis of the tunnel, a spring upon which said scraper is mounted, said spring being adapted to hold said scraper to its work normally and to yield upon engagement by the scraper of an unusual obstacle.

18. In a tunneling machine, a frame work, a rotatable structure mounted upon said frame-work, the shape of said structure being substantially that of a truncated cone with the large end forward and the axis inclined downwardly toward the rear and abrading means arranged at the forward extremity of the structure.

19. In a tunneling machine the combination with a longitudinal traveling carriage of a structure rotatably mounted thereon and equipped with abrading members, said structure diminishing in diameter rearwardly from the abrading members and having its axis inclined to the axis of the tunnel, substantially as described.

20. In a tunneling machine, a rotatable structure, a series of principal abrading heads carried by said structure, an auxiliary abrading head carried by said structure, and means for causing said auxiliary head to protrude beyond the zone of operation of the principal heads during a portion of each revolution of the rotatable structure.

21. A tunneling machine comprising a working head mounted to rotate, and equipped with cutting means, rollers mounted on the head and exteriorly arranged to engage the wall of the tunnel, a circumferentially adjustable ring in which one extremity of each roller is journaled, and a fixed ring in which the other extremity of each roller is journaled, whereby the rollers may be turned through the medium of the adjustable ring at an angle with the axis of the main head, substantially as described.

22. A tunneling machine comprising a working head, mounted to rotate, and equipped with cutting means, means for rotating the head, rollers mounted on the said head and arranged to engage the wall of the tunnel, a circumferential, adjustable band in which one extremity of each roller is journaled, and a fixed support in which the other extremity of each roller is journaled, whereby the said rollers may be turned at an angle to the main axis of the head, for the purpose set forth.

23. A tunneling machine, including a working head rotatably mounted and equipped with abrading elements, the said head having chambers extending longitudinally therethrough, conveyer belts passing through the said chambers, means mounted on the head and arranged to discharge material into the said chambers, and means for imparting intermittent rearward travel to the upper run of the belts of the said chambers for the purpose of removing the material, substantially as described.

In testimony whereof I affix my signature in presence of two witnesses.

CARL W. HODGSON.

Witnesses:
SOLON J. BOUGHTON,
MAY CLEMENTS.